US007365633B2

(12) United States Patent
Inoue et al.

(10) Patent No.: US 7,365,633 B2
(45) Date of Patent: Apr. 29, 2008

(54) VEHICLE REMOTE CONTROL APPARATUS AND VEHICLE REMOTE CONTROL SYSTEM USING THE SAME

(75) Inventors: Makoto Inoue, Hirakata (JP); Tsutomu Maeda, Shijonawate (JP); Masaaki Ochi, Hirakata (JP)

(73) Assignee: Matsushita Electric Industrial Co., Ltd.

( * ) Notice: Subject to any disclaimer, the term of this patent is extended or adjusted under 35 U.S.C. 154(b) by 456 days.

(21) Appl. No.: 10/530,530

(22) PCT Filed: Oct. 20, 2004

(86) PCT No.: PCT/JP2004/015875

§ 371 (c)(1),
(2), (4) Date: Apr. 7, 2005

(87) PCT Pub. No.: WO2005/038726

PCT Pub. Date: Apr. 28, 2005

(65) Prior Publication Data

US 2006/0006983 A1 Jan. 12, 2006

(30) Foreign Application Priority Data

Oct. 21, 2003 (JP) ............................ 2003-360214

(51) Int. Cl.
*H04B 1/38* (2006.01)

(52) U.S. Cl. .................. 340/5.61; 340/5.72; 340/10.2; 307/10.1; 307/10.2; 307/10.3; 307/10.4; 307/10.5; 307/10.6

(58) Field of Classification Search ................ 340/5.61
See application file for complete search history.

(56) References Cited

U.S. PATENT DOCUMENTS

| | | | |
|---|---|---|---|
| 6,429,768 B1 | 8/2002 | Flick | |
| 6,765,471 B1 | 7/2004 | Baudard et al. | |
| 6,831,547 B2 * | 12/2004 | Watarai et al. | 340/5.61 |
| 2001/0028296 A1 | 10/2001 | Masudaya | |
| 2003/0038732 A1 | 2/2003 | Watari et al. | |

FOREIGN PATENT DOCUMENTS

| | | | |
|---|---|---|---|
| EP | 1 041 226 A | | 10/2000 |
| FR | 2 814 188 A | | 3/2002 |
| JP | 06269065 A | * | 9/1994 |
| JP | 2003-106019 A | | 4/2003 |

OTHER PUBLICATIONS

International Search Report for PCT/JP2004/015875, dated Jan. 17, 2005.

* cited by examiner

*Primary Examiner*—Brian Zimmerman
*Assistant Examiner*—John Lambert
(74) *Attorney, Agent, or Firm*—RatnerPrestia

(57) ABSTRACT

A vehicle remote control apparatus has: A) a first transmitter for outputting an authentication request signal to a mobile device including a radio terminal assigned with an identification code special to a vehicle and outputting an authentication response signal corresponding to the identification code; B) a second transmitter for outputting an interference wave to cancel the authentication request signal at the same time as the first transmitter transmits the authentication request signal; C) a receiver for receiving the authentication response signal output from the mobile device in response to the authentication request signal, thereby checking authenticity of the authentication response signal; and D) a controller for controlling operation of an on-vehicle equipment based on the result of authentication of the authentication response signal.

6 Claims, 6 Drawing Sheets

VEHICLE REMOTE CONTROL APPARATUS AND VEHICLE REMOTE CONTROL SYSTEM USING THE SAME

THIS APPLICATION IS A U.S. NATIONAL PHASE APPLICATION OF PCT INTERNATIONAL APPLICATION PCT/JP2004/015875.

TECHNICAL FIELD

The present invention relates to a vehicle remote control apparatus for controlling a vehicle by authenticating a mobile device including a radio terminal assigned with an identification code special to the vehicle.

BACKGROUND ART

In recent years, there have been rapidly developed a vehicle remote control apparatus capable of opening and closing a vehicle door lock without inserting a key into the door. FIG. 6 is a configuration diagram of a conventional vehicle remote control system and FIG. 7 is an operation sequence diagram of the vehicle remote control apparatus shown in FIG. 6. In other words, FIG. 7 shows a sequence of outputting of signals from various units. FIG. 8 and FIG. 10 are also configuration diagrams of the conventional vehicle remote control system in different situations and FIG. 9 and FIG. 11 are operation sequence diagrams in the respective situations.

Near the driver's door and near the assistant driver's door of the vehicle, there are respectively provided antennas 11, 12 for transmitting signals for authentication. Further, within or near a rear bumper on the driver's side and within or near the bumper on the assistant driver's side, there are provided antennas 13, 14. Antennas 11, 13 have communication ranges 11A, 13A, respectively.

In the configuration described above, suppose now that owner 5 of the vehicle carrying a mobile device 4 including a radio terminal assigned with an identification code special to the vehicle approaches the vehicle from the driver's side as shown in FIG. 6. When owner 5 touches the door on the driver's side, outside door switch 2 is turned on and this ON-signal is transmitted to controller 1. Thereupon, controller 1 outputs authentication request signal 701.

Since mobile device 4 is present within range. 11A at this time, mobile device 4 outputs authentication response signal 702. Authentication signal receiver (hereinafter called "receiver") 8 receives response signal 702, and when this signal is verified against the registered code and validated, receiver 8 outputs door lock opening signal 703 to controller 1, whereby the door lock is released.

Then, suppose that controller 1 outputs authentication request signal 901 from antenna 11 when mobile device 4 is positioned at the rear of the vehicle as shown in FIG. 8. Since mobile device 4 is present out of range 11A at this time, mobile device 4 does not output an authentication response signal. In such a case, controller 1 outputs authentication request signal 902 from antenna 13 after a predetermined period of time. Since mobile device 4 is now present within range 13A where authentication request signal 902 is communicatable, it outputs authentication response signal 903, and receiver 8 receives response signal 903. Receiver 8 verifies and validates the received signal and outputs door lock opening signal 904 to controller 1, whereby the door lock is released.

Likewise, when owner 5 carrying mobile device 4 approaches the vehicle from the assistant driver's side, an ON-signal of outside door switch 3 on the assistant driver's side is transmitted to controller 1. Controller 1 outputs an authentication request signal from antenna 12. If mobile device 4 is present within the communication range of antenna 12, mobile device 4 outputs an authentication response signal. Receiver 8 receives this response signal and if the signal matches with the registered code, it outputs a door lock opening signal to controller 1 and thereby the door lock is released.

Further, when owner 5 carrying mobile device 4 approaches the vehicle from the rear of the vehicle, an ON-signal of outside door switch 7 at the rear of the vehicle is transmitted to controller 1, and controller 1 outputs an authentication request signal from antenna 13, 14. If mobile device 4 is present within the communication range of antenna 13 or antenna 14, mobile device 4 outputs an authentication response signal. Receiver 8 receives this signal and outputs a door lock opening signal to controller 1, if it matches with the registered code, thereby, the door lock is released. Such a vehicle remote control apparatus as described above is disclosed, for example, in Japanese Patent Unexamined Publication No. 2003-106019.

However, there is a problem with the above described conventional system as follows. In FIG. 10, owner 5 carrying mobile device 4 is within the communication range 13A of antenna 13 at the rear of the vehicle on the driver's side but the owner is just present there with no intention to open a door of the vehicle. For some time in the beginning, there is no response made to authentication request signal 1101 output from antenna 11 and, hence, door lock opening signal 1104 is not output. However, if stranger 6 approaches the vehicle from the driver's side and turns on switch 2 unnoticed by owner 5, mobile device 4 transmits authentication response signal 1103 when authentication request signal 1102 is output. Namely, authentication is validated because mobile device 4 is present within communication range 13A of antenna 13. Thus, the door lock is released and the door is opened by stranger 6 while it is unnoticed by owner 5.

DISCLOSURE OF THE INVENTION

A vehicle remote control apparatus according to the present invention includes a first transmitter, a second transmitter, a receiver, and a controller. The first transmitter outputs an authentication request signal to a mobile device including a radio terminal assigned with an identification code special to a vehicle and outputting an authentication response signal corresponding to the identification code. The second transmitter outputs an interference wave canceling the authentication request signal at the same time as the first transmitter transmits the authentication request signal. The receiver receives the authentication response signal output from the mobile device in response to the authentication request signal and, thereby, checks authenticity of the authentication response signal. The controller controls operation of on-vehicle equipment based on result of authentication of the authentication response signal. In the described configuration, limits are set to the communicatable range between the mobile device and the first transmitter, and therefore, opening the doors, starting an engine of the vehicle, and the like of the vehicle by a stranger other than the owner of the vehicle can be prevented.

DETAILED DESCRIPTION OF PREFERRED EMBODIMENT

Figure 1:
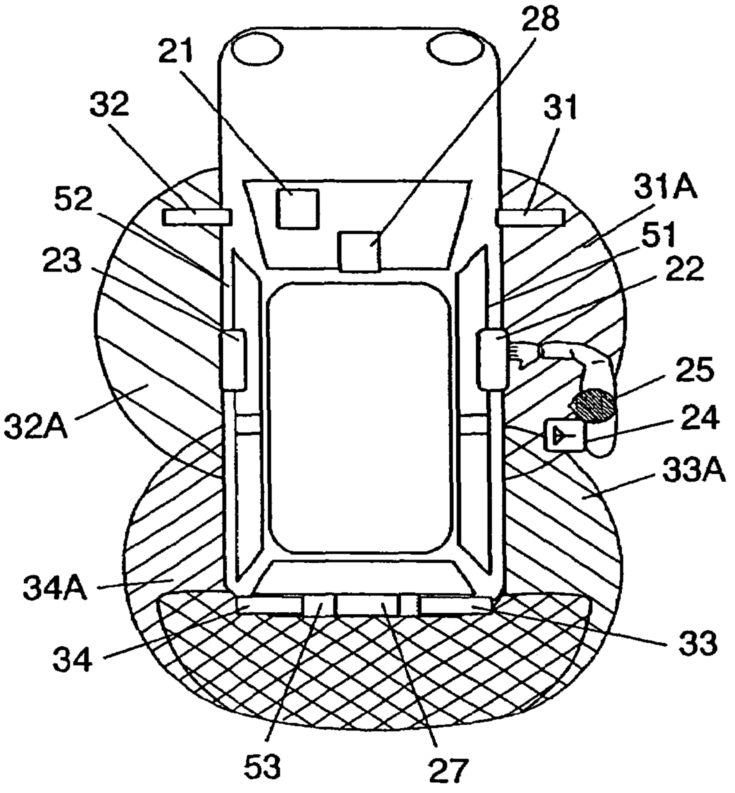
FIG. 1 and FIG. 4 are configuration diagrams of a vehicle remote control system of an embodiment of the present invention.
Figure 2:
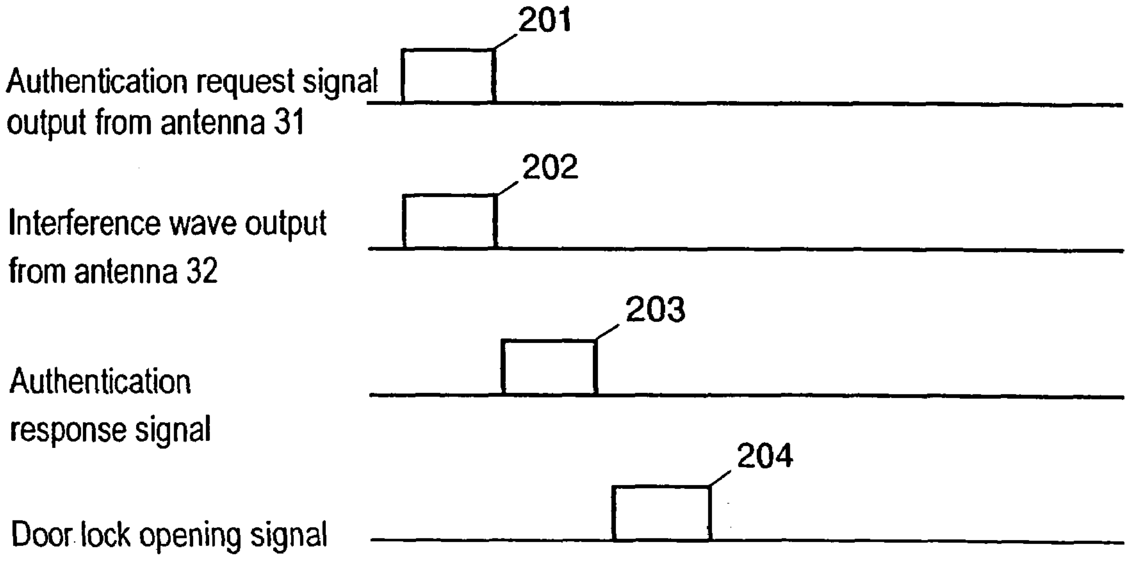
FIG. 2 is an operation sequence diagram of the vehicle remote control system in FIG. 1.
Figure 3:
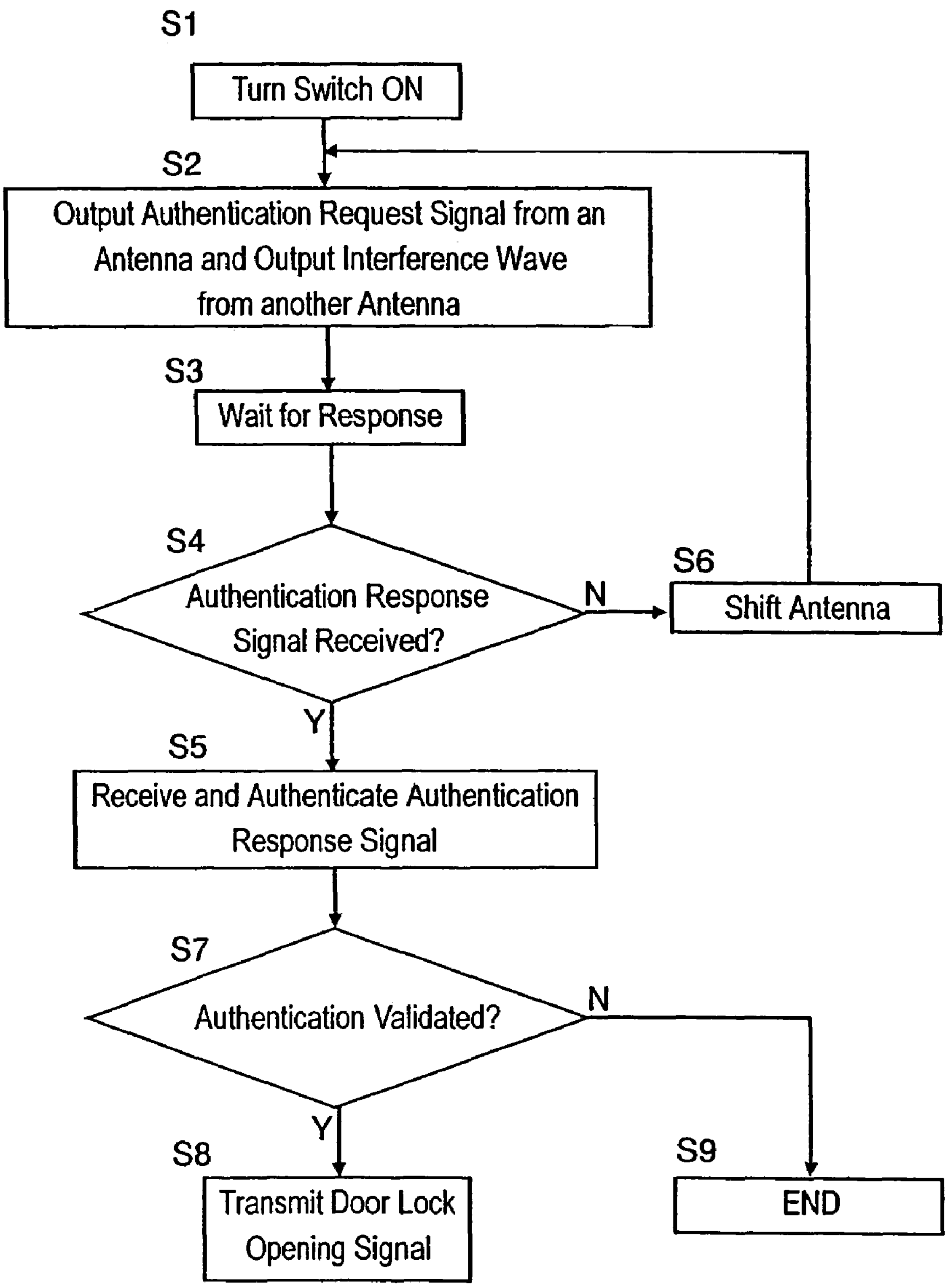
FIG. 3 is a flowchart explanatory of operations in a vehicle remote control apparatus shown in FIG. 1.

FIG. 1 is a configuration diagram of a vehicle remote control system according to an embodiment of the present invention and FIG. 2 is a sequence diagram of the same system. In other words, FIG. 2 shows a sequence of signals output from various units. FIG. 3 is a flowchart explanatory of operations in a vehicle remote control apparatus used in the same system.

In the vicinity of driver's door 51 and assistant driver's door 52, there are provided antennas 31 and 32 as transmitters for transmitting signals for authentication, respectively. Also, on the: driver's side or thereabout of rear bumper 53 and on the assistant driver's side or thereabout of bumper 53, there are provided antennas 33 and 34 as transmitters for transmitting signals for authentication, respectively.

Outside door switches (hereinafter called switches) 22, 23, 27 are provided in the vicinity of driver's door 51, assistant driver's door 52, and bumper 53, respectively, and turned on when touched by a person. Controller 21 receives a signal from switch 22, 23, 27, transmits a signal to mobile device 24 through antennas 31-34, and receives a signal through authentication signal receiver (hereinafter called "receiver") 28. It also controls unlocking of doors 51, 52. Mobile device 24 includes a radio terminal having an identification code special to the vehicle assigned thereto. Antennas 31, 32, 33 and 34 are capable of making communication within their respective communication ranges 31A, 32A, 33A and 34A.

Operation of the system including the vehicle remote control apparatus according to the present embodiment will be described below with reference to FIG. 2 and FIG. 3.

Suppose now that vehicle owner 25 carrying mobile: device 24 approaches the vehicle from the driver's side. When owner 25 touches switch 22 in the vicinity of door 51, switch 22 is turned on and this ON-signal is transmitted to controller 21. Thereupon, controller 21 outputs authentication request signal 201 from antenna 31. At the same time, it causes interference wave 202—a burst signal or the like to cancel authentication request signal 201—to be output, for example, from antenna 32 as another transmitter.

At this time, if there is present mobile device 24 within range 31A, mobile device 24 outputs authentication response signal 203 corresponding to the identification code and receiver 28 receives this response signal 203. If it is confirmed as the registered code (i.e., if its authenticity is validated) by receiver 28, door lock opening signal 204 is output to controller 21 and thereby the door lock is released. Also, when owner 25 carrying mobile device 24 approaches the vehicle and touches switch 23 or switch 27, similar event occurs. Here, controller 21 first outputs authentication request signal 201 from antenna 31. If there are made no responses thereto for some time, it changes the transmitters in turn to antenna 32, antenna 33, and to antenna 34, sequentially. More specifically, functions of the antennas, i.e., outputting of the authentication request signal and outputting of the interference wave, are sequentially shifted when authentication response signals thereto are not received a predetermined period of time.

How the apparatus works will be described more concretely with reference to FIG. 3. Owner 25 touches one of switches 22, 23, 27 and turns the switch ON (S1). Then, controller 21 upon receipt of this ON-signal, outputs an authentication request signal to antenna 31. At the same time, it causes, for example, antenna 32 as another transmitter to output an interference signal formed of a burst wave or the like, and then it waits for an authentication response signal to be output from mobile device 24 (S3). When receiver 28 receives the response signal at S4, the processing proceeds to S5 and, if no response is obtained at S4, it shifts the transmitter (antenna) outputting the authentication request signal and the transmitter outputting the interference signal (S6) and, then, returns to S2. At S5, receiver 28 checks the received response signal for its authenticity. If the authenticity is validated at S7, a door lock opening signal is output to controller 21 and the door lock is released (S8). If the authenticity is not validated, the door lock remains locked and the processing ends (S9). Namely, controller 21 controls the operation of on-board equipment based on the result of authentication of the authentication response signal. In the present case, unlocking of doors 51, 52 is controlled.

Figure 4:
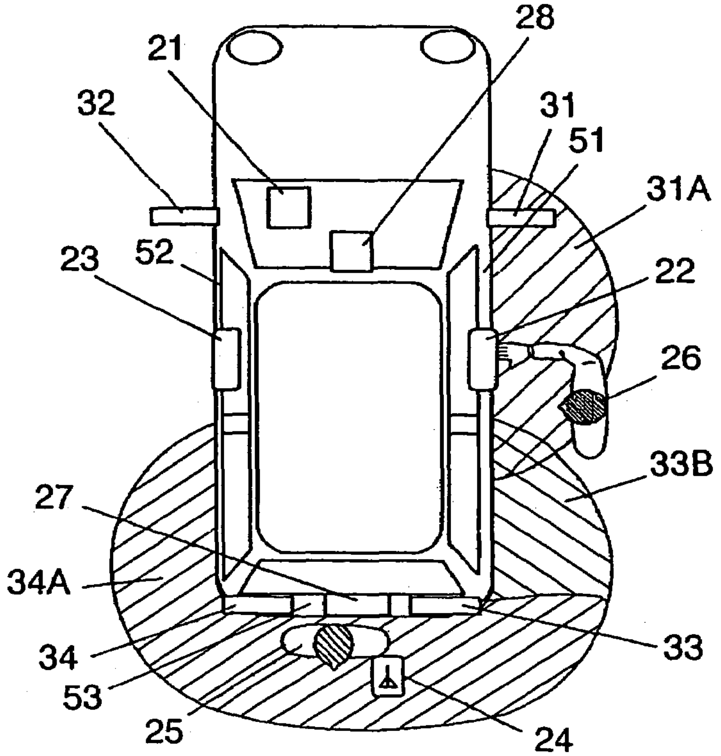
Figure 5:
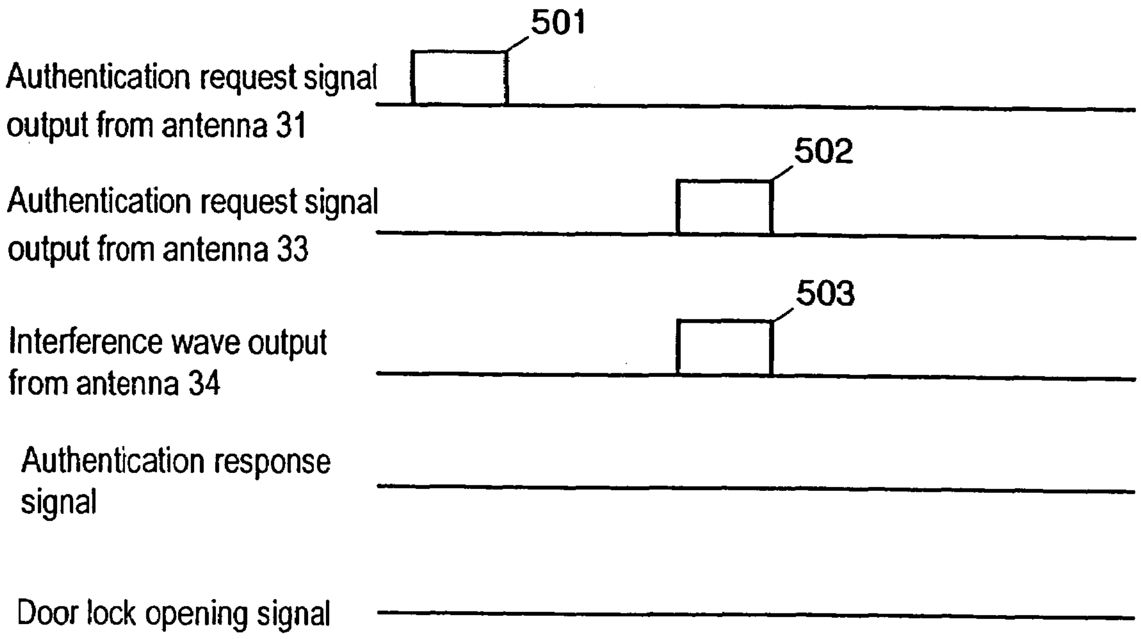
FIG. 5 is an operation sequence diagram of the vehicle remote control system in FIG. 4.
Figure 6:
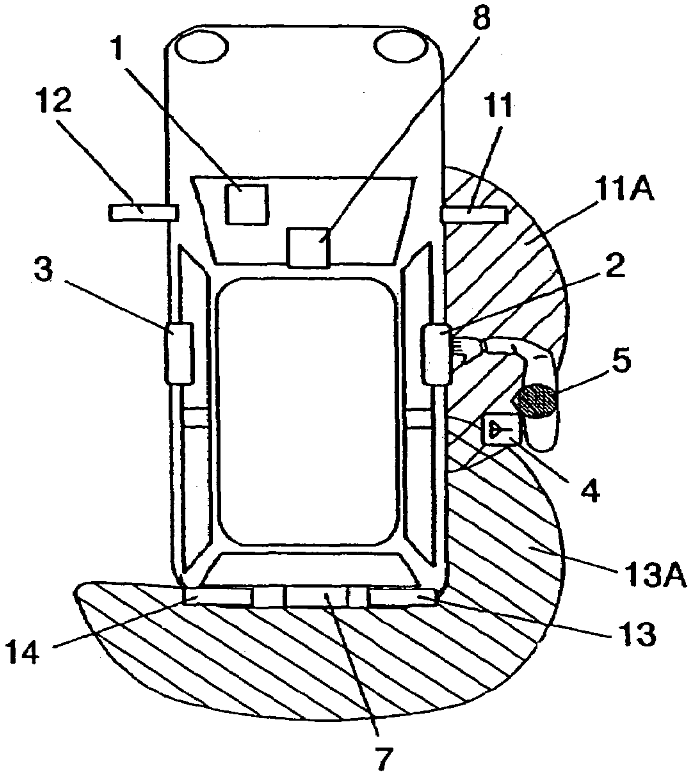
FIG. 6 PRIOR ART
FIG. 6, FIG. 8, and FIG. 10 are configuration diagrams of a conventional vehicle remote control system.
Figure 7:
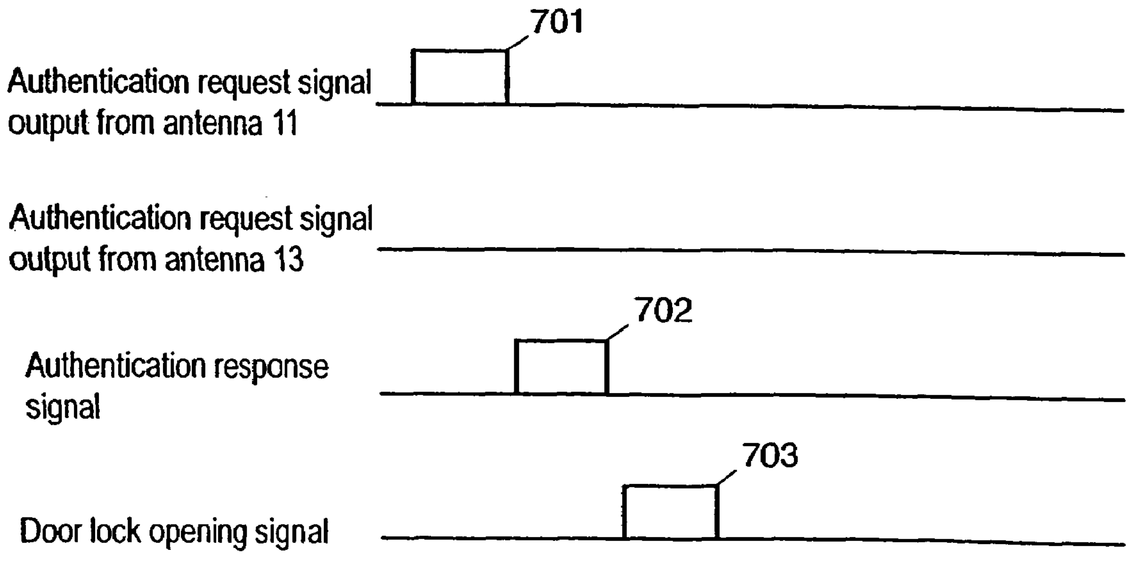
FIG. 7 PRIOR ART
FIG. 7 is an operation sequence diagram of the vehicle remote control system in FIG. 6.
Figure 8:
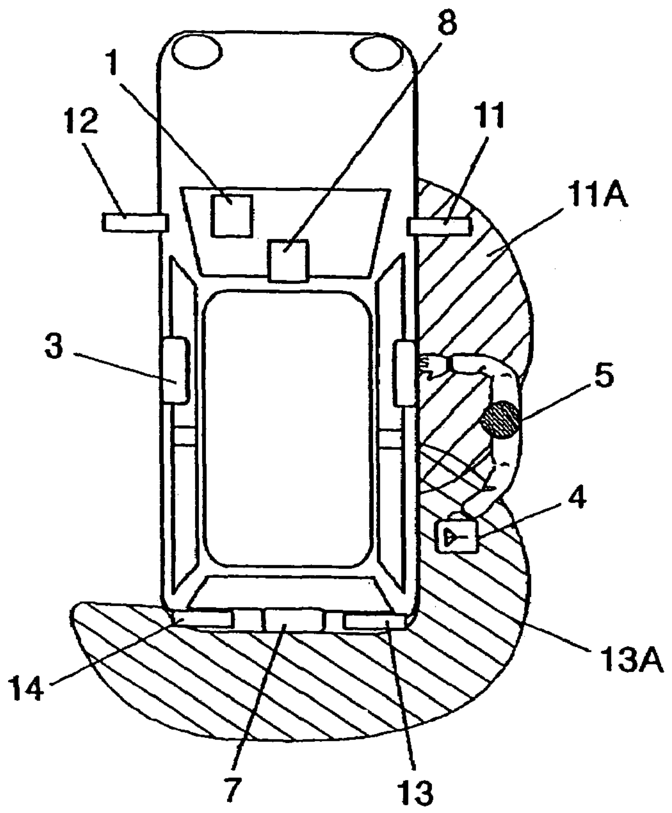
FIG. 8 PRIOR ART
Figure 9:
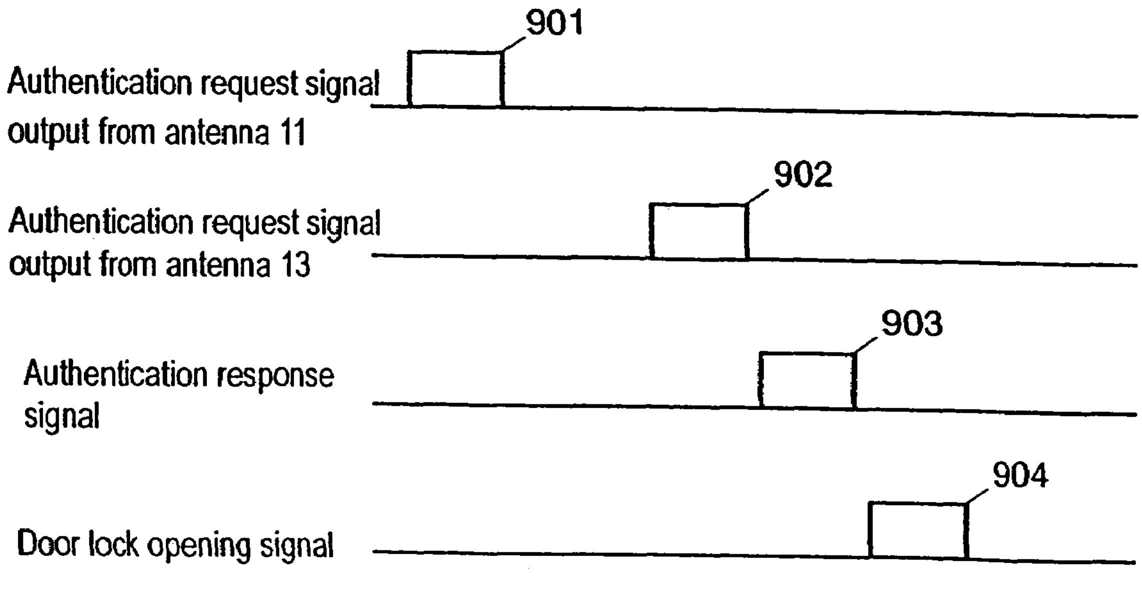
FIG. 9 PRIOR ART
FIG. 9 is an operation sequence diagram of the vehicle remote control system in FIG. 8.
Figure 10:
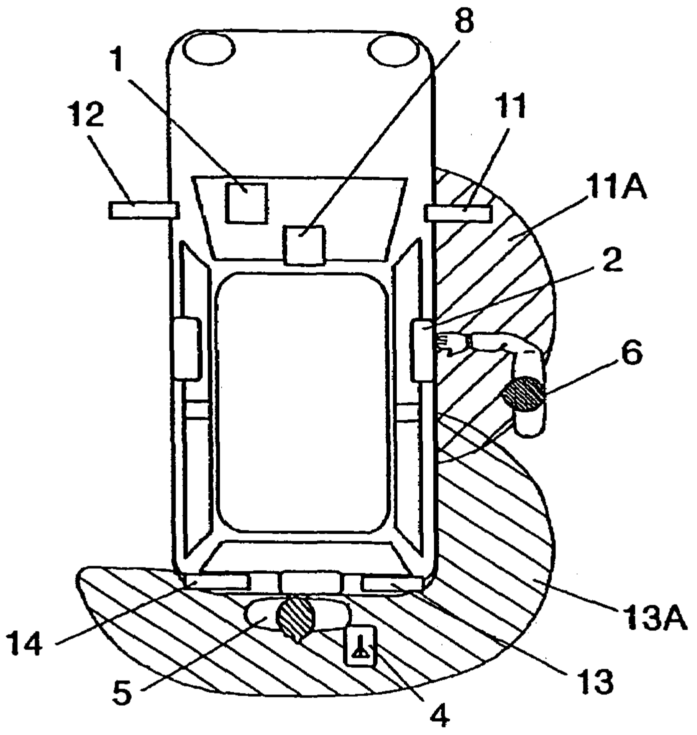
FIG. 10 PRIOR ART
Figure 11:
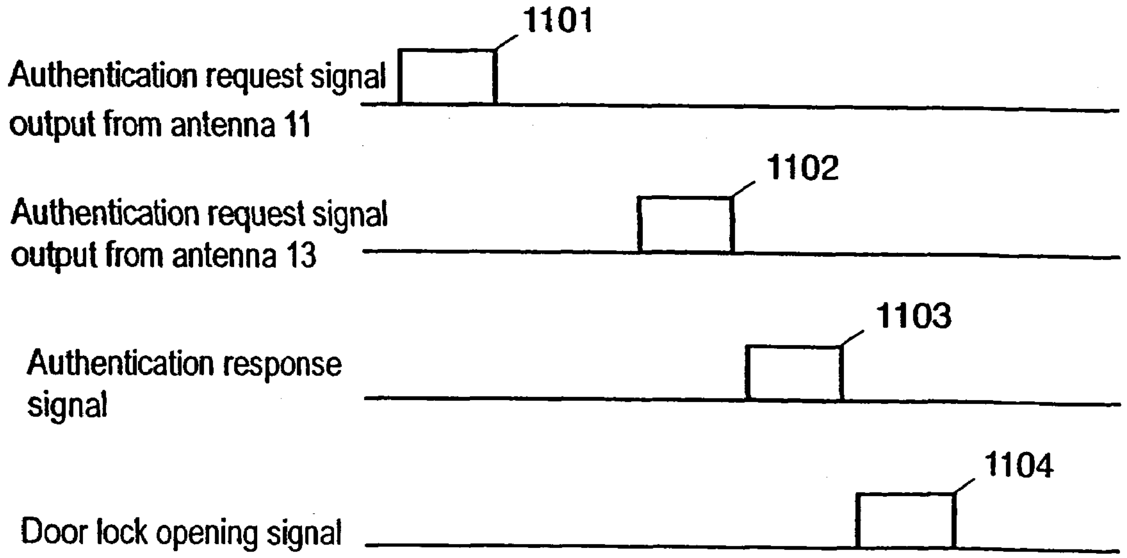
FIG. 11 PRIOR ART
FIG. 11 is an operation sequence diagram of the vehicle remote control system in FIG. 10.

Referring now to the configuration diagram of FIG. 4 and the sequence diagram of FIG. 5, a case where owner 25 carrying mobile device 24 is within range 34A and just keeps staying there with no intention to open a door of the vehicle will be discussed. If, at this time, stranger 26 approaches the vehicle from the side of door 51 without being noticed by owner 25 and turns switch 22 on, controller 21 receives this ON-signal and outputs authentication request signal 501 from antenna 31 in the vicinity of door 51.

Since, however, mobile device 24 is out of range 31A, an authentication response signal is not output. Consequently, receiver 28 is unable to receive any authentication response signal. Then, after a predetermined time period, controller 21 outputs authentication request signal 502 from antenna 33. At the same time, antenna 34 outputs interference wave 503 such as a burst wave to thereby interfere with authentication request signal 502 upon its being output. Therefore, the communicatable range of the authentication request signal from antenna 33 is limited to range 33B by reachable range 34A of interference wave 503 from antenna 34.

Thus, authentication request signal 502 is put into its uncommunicatable state within range 34A, i.e., mobile device 24 is placed out of range 33B, where it is capable of receiving authentication request signal 502 from antenna 33. Therefore, mobile device 24 does not output its authentication response signal and, hence, receiver 28 does not receive any authentication response signal.

Therefore, a door lock opening signal is not output and stranger 26 cannot release the door lock even if the person turns on switch 22. Consequently, owner 25 is enabled to prevent the door from being opened by stranger 26.

Likewise, even if stranger 26 approaches the vehicle from the side of door 52 and turns switch 23 on, the same effect as described above may be obtained by adapting such that an interference wave is output from antenna 33 at the same time as an authentication request signal is output from antenna 34. Thereby, unlocking of the door lock by stranger 26 can be prevented. Incidentally, the interference wave may be output from one or more antennas, provided that such antennas are others than the antenna outputting the authentication request signal.

Although, in the present embodiment, description is made taking, as an example, the case where communication ranges are provided by the antennas arranged as shown in FIG. 1, it is possible to control the communication ranges by changing the number of antennas outputting interference waves and their places of installation relative to the antennas outputting authentication signals, depending on the characteristics and number of these antennas.

Although, in the above description, release of a door lock is controlled in accordance with result of authentication with respect to the mobile device, engine start or the like may also be controlled in accordance with result of authentication with respect to the mobile device.

INDUSTRIAL APPLICABILITY

In the vehicle remote control apparatus according to the present invention, it is adapted such that, while an authentication request signal is output from a selected transmitter, an interference wave is simultaneously output from at least one transmitter other than the selected transmitter. By virtue of the configuration described above, a vehicle remote control system of high security can be provided. The vehicle remote control apparatus is useful as a vehicle remote control apparatus for controlling door lock release and engine start of a vehicle based on result of authentication with respect to a mobile device.

The invention claimed is:

1. A vehicle remote control apparatus comprising:

a first transmitter with a first function outputting an authentication request signal to a mobile device, the mobile device including a radio terminal assigned with an identification code special to a vehicle and outputting an authentication response signal corresponding to the identification code;

a second transmitter with a second function of outputting an interference wave canceling the authentication request signal at the same time as the first transmitter transmits the authentication request signal;

a receiver for receiving the authentication response signal output from the mobile device in response to the authentication request signal, thereby checking authenticity of the authentication response signal;

a controller for controlling operation of an on-vehicle equipment unit based on a result of authentication of the authentication response signal; and wherein the first transmitter and the second transmitter exchange the first function and the second function when the receiver does not receive an authentication response signal for a predetermined period of time.

2. The vehicle remote control apparatus according to claim 1, wherein the interference wave sets limits to a communicatable range between the first transmitter and the mobile device.

3. The vehicle remote control apparatus according to claim 1, wherein the on-vehicle equipment unit is a door of the vehicle and the controller controls a lock of the door.

4. The vehicle remote control apparatus according to claim 3, wherein the controller releases the lock of the door when the authentication of the authentication response signal is validated.

5. The vehicle remote control apparatus according to claim 1, wherein the interference wave is a burst wave.

6. A vehicle remote control system comprising:

a mobile device including a radio terminal assigned with an identification code special to a vehicle and outputting an authentication response signal corresponding to the identification code; and a vehicle remote control apparatus having:

a first transmitter with a first function of outputting an authentication request signal to the mobile device;

a second transmitter with a second function of outputting an interference wave canceling the authentication request signal at the same time as the first transmitter transmits the authentication request signal;

a receiver for receiving the authentication response signal output from the mobile device in response to the authentication request signal, thereby checking authenticity of the authentication response signal;

a controller for controlling operation of an on-vehicle equipment based on a result of authentication of the authentication response signal; and wherein the first transmitter and the second transmitter exchange the first function and the second function when the receiver does not receive an authentication response signal for a predetermined period of time.

* * * * *